No. 771,815. PATENTED OCT. 11, 1904.
J. H. B. DEUSTER & H. A. MASCHMEYER.
LUBRICATOR.
APPLICATION FILED APR. 4, 1904.
NO MODEL.

Witnesses:
Inventors
John H. B. Deuster
Herman A. Maschmeyer
By Benedict & Morsell
Attorneys No. 771,815.

Patented October 11, 1904.

UNITED STATES PATENT OFFICE.

JOHN H. B. DEUSTER AND HERMAN A. MASCHMEYER, OF MILWAUKEE, WISCONSIN.

LUBRICATOR.

SPECIFICATION forming part of Letters Patent No. 771,815, dated October 11, 1904.

Application filed April 4, 1904. Serial No. 201,391. (No model.)

*To all whom it may concern:*

Be it known that we, JOHN H. B. DEUSTER and HERMAN A. MASCHMEYER, residing in Milwaukee, in the county of Milwaukee and State of Wisconsin, have invented new and useful Improvements in Lubricators, of which the following is a description, reference being had to the accompanying drawings, which are a part of this specification.

This invention relates to certain new and useful improvements in lubricators, and has for its object to provide means for controlling the supply of lubricant to any fluid-pressure-operated mechanism.

A further object of this invention is to provide such lubricating means which will be adapted to automatically stop the supply of lubricant to the mechanism when the supply of fluid-pressure for operating said mechanism ceases and which will automatically start the supply of lubricant when the fluid-pressure is again admitted to the mechanism.

A further object of this invention is to accomplish such control of the lubricant-supply by means of a valve influenced by the fluid-pressure on both sides of the valve controlling the supply of fluid-pressure to the mechanism.

With the above and other objects in view the invention consists in the devices and parts and their equivalents, as hereinafter set forth.

Figure 1:
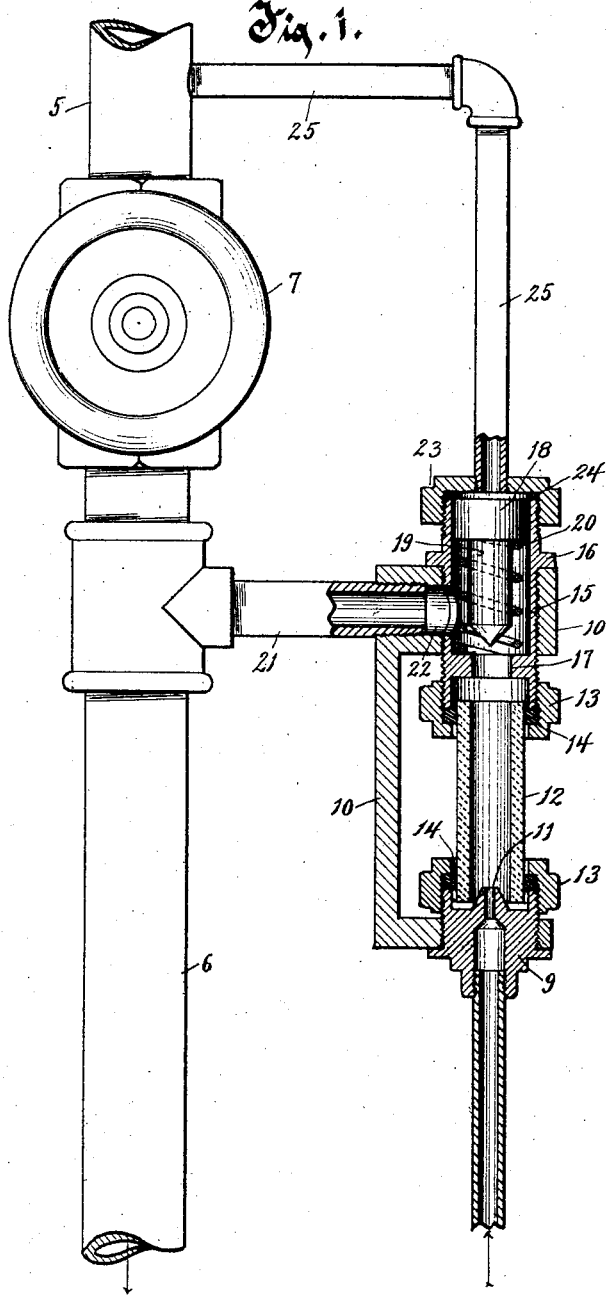
Figure 2:
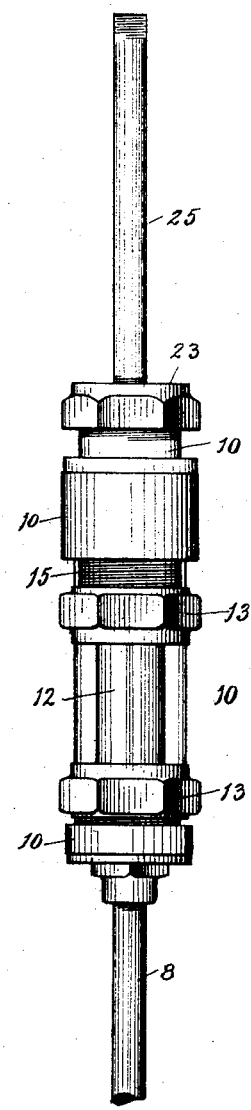

Referring to the accompanying drawings, in which like characters of reference indicate the same parts in the different views, Figure 1 is a vertical sectional view of one embodiment of this invention in connection with a valved steam-pipe, and Fig. 2 is a front elevation thereof removed from the steam-pipe.

As exemplifying this invention we have chosen to illustrate and describe a particular embodiment thereof adapted for use with a valved steam - pipe, preferably supplying steam for a steam-engine or a steam-pump, though the invention is not restricted to any particular form of device nor for use with any particular fluid-pressure for any purpose.

In the figures, 5 represents a live-steam pipe, and 6 is the supply-pipe leading to the cylinder of a steam-engine or steam-pump and in connection with the live-steam pipe 5 through the throttle-valve 7.

A pipe 8 leads from a source of lubricant-supply under pressure and connects with a nipple 9, threaded in the lower arm of a U-shaped bracket 10, which is adapted to be secured to the engine or other support, and the nipple 9 has its reduced bore terminating in a nozzle 11, which projects into the lower end of a sight-feed tube 12, preferably of glass. The sight-feed tube 12 is suitably connected to the nipple 9 by means of a flanged collar 13, threaded on the upper end of the nipple 9, and clamping between its inturned upper flange and the upper end of the nipple 9 a resilient gasket 14, usually of rubber, so as to tightly press against the lower end of the sight-tube 12.

In the upper arm of the bracket 10 and in alinement with the nipple 9 is threaded a tubular valve-chamber 15, with its annular flange 16 resting upon the top of the said arm of the bracket 10, and at its lower end it is connected to the upper end of the sight-tube 12 in the same manner as the nipple 9 is connected to the lower end thereof by means of the collar 13, threaded thereto and clamping the gasket 14 against the upper end of the sight-tube 12, as before described, for the corresponding parts at the lower end of the sight-tube.

Near its lower end the valve-chamber 15 has an interior annular flange 17 with its reduced bore forming a valve-seat for a piston-valve 18, which tightly fits within the valve-chamber 15 and is adapted to close the valve-seat by the tapering end of its depending stem 19. A coil compression-spring 20 surrounds the valve-stem 19 and bears at its upper end on the under side of the enlarged head of the valve, which forms the piston in the valve-casing, and bears at its lower end upon the internal flange 17, so as to give the valve a tendency to keep its upper or open position, as shown in Fig. 1.

A pipe 21 is threaded in a bore 22 in the upper arm of bracket 10, which communicates with the interior of the valve-chamber 15 beneath the piston-head of the valve, and said pipe 21 also connects with the supply-pipe 6, leading to the engine, which pipe, as before stated, is beyond the throttle-valve 7. A cap 23 is threaded on the upper end of the valve-chamber 15, with a gasket 24 interposed therebetween and connected to it, and communicating with the interior of the valve-chamber above the piston-head of the valve is a pipe 25, which also connects with the live-steam pipe 5 ahead of the throttle-valve 7.

In operation when the throttle-valve 7 is open, so that live steam is admitted through pipes 5 and 6 to the engine or other mechanism to be operated thereby, the pipes 25 and 21 convey the pressure of the steam to the upper and lower sides of the piston-head of the valve 18, respectively. The pressures on opposite sides of the piston-valve being virtually the same neutralize each other, so as to have no effect upon the valve, which is therefore held open, as shown in Fig. 1, and the oil under pressure is fed from the nozzle 11 in drops, which rise through the column of water naturally accumulating in the sight-tube 12 by condensation and pass up the tube, through the valve-seat, and by way of pipe 21 to the pipe 6, where it is carried by the passing steam to the cylinder of the engine or other mechanism supplied with the steam. When the throttle-valve 7 is closed to bring the engine or other mechanism to rest, the supply-pipe 6, being deprived of the live-steam pressure and containing only atmospheric pressure, gives to the valve-chamber 15 beneath the piston-head of valve 18, through its connection therewith by pipe 21, such reduced pressure, and as the pressure upon the top of the piston-head of valve 18 remains unchanged and of the live-steam pressure such pressure overcomes the tendency of the spring 20 to keep the valve open and forces said valve downwardly until the tapering end of its stem 19 tightly fits upon the valve-seat of the flange 17, and so stops the supply of oil.

While the valve 18 is closed in the manner just described the oil is held in check and does not leave the nozzle 11 until the valve 18 is again opened by the opening of the throttle-valve 7 for again starting the engine or other mechanism; but when said throttle-valve 7 is opened and the live-steam pressure is again admitted to the under side of the head of valve 18 the spring 20 will again assert itself and raise the valve 18 from its seat.

While we have shown a sight-feed lubricator applied to a valved steam-supply pipe, it is obvious that the invention is not confined thereto, but that any other form of lubricator applied to any form of fluid-pressure supply may be employed without departing from the spirit and scope of this invention. For instance, the pipes 5 and 6 may as well be employed for conveying compressed air, and the oil-pipe 8 may be connected direct to the valve-chamber 15 without the use of the sight-feed tube and nozzle, and many other modifications may be made in the arrangement and construction and use of the device here shown and described within the limits of this invention.

What we claim as our invention is—

1. In a lubricator, a lubricant-supply pipe, a valved fluid-pressure pipe, and a valve for controlling the flow of lubricant in the lubricant-supply pipe and controlled by the pressure on opposite sides of the valve in the fluid-pressure-supply pipe.

2. In a lubricator, a lubricant-supply pipe, a valved fluid-pressure-supply pipe, and a valve for controlling the flow of lubricant through the lubricant-supply pipe having connection with the fluid-pressure-supply pipe on opposite sides of the valve of said fluid-pressure-supply pipe.

3. In a lubricator, a lubricant-supply pipe, a valved fluid-pressure-supply pipe, a valve-chamber having connection with the fluid-pressure-supply pipe on opposite sides of the valve of said fluid-pressure-supply pipe, and a valve operating in said valve-chamber and controlling the supply of lubricant from said lubricant-supply pipe.

4. In a lubricator, a lubricant-supply pipe, a valved fluid-pressure-supply pipe, a valve-chamber having connection with the fluid-pressure-supply pipe on opposite sides of the valve of said fluid-pressure-supply pipe, and a spring-pressed piston-valve operating in the valve-chamber and controlling the supply of lubricant from the lubricant-supply pipe.

5. In a lubricator, a valved fluid-pressure-supply pipe, a cylindrical valve-chamber having connection with the fluid-pressure-supply pipe on opposite sides of the valve of the fluid-pressure-supply pipe, a piston-valve fitting within the cylindrical valve-chamber between the connections thereof with the fluid-pressure-supply pipe, and a lubricant-supply controlled by the movements of the piston-valve.

6. In a lubricator, a valved fluid-pressure-supply pipe, a cylindrical valve-chamber having connection with the fluid-pressure-supply pipe on opposite sides of the valve of said fluid-pressure-supply pipe, a spring-pressed piston-valve fitting within the cylindrical valve-chamber between the connections thereof with the fluid-pressure-supply pipe, and a lubricant-supply pipe controlled by the movements of the piston-valve.

7. In a lubricator, a valved fluid-pressure-supply pipe, a cylindrical valve-chamber having connection with the fluid-pressure-supply pipe on opposite sides of the valve of the fluid-pressure-supply pipe, and having an internal flange forming a valve-seat, a lubricant-supply pipe having connection with the valve-seat, a piston-valve fitting within the cylindrical valve-chamber between the connections thereof with the fluid-pressure-supply pipe, and having a valve-stem with a tapering end to fit the valve-seat, and a coil compression-spring seated on the internal flange of the valve-chamber and bearing on the valve.

8. In a lubricator, a lubricant-supply pipe, a nipple connected therewith, a bracket supporting the nipple, a sight-feed tube connected with the nipple, a cylindrical valve-chamber supported by the bracket and connected to the sight-feed tube, said valve-chamber having an internal annular flange forming a valve-seat, a piston-valve fitting within the cylindrical valve-chamber and having a depending stem with a tapering end to fit the valve-seat, a coil compression-spring surrounding the valve-stem and bearing on the internal flange and the head of the valve, a valved fluid-pressure-supply pipe, a connection between the cylindrical valve-chamber on one side of the valve thereof with the fluid-pressure-supply pipe ahead of the valve of the fluid-pressure-supply pipe, and a connection from the cylindrical valve-chamber on the other side of the valve thereof with the fluid-pressure-supply pipe beyond the valve of the fluid-pressure-supply pipe.

In testimony whereof we affix our signatures in presence of two witnesses.

JOHN H. B. DEUSTER.
HERMAN A. MASCHMEYER.

Witnesses:
R. S. C. CALDWELL,
ANNA F. SCHMIDTBAUER.